Jan. 16, 1968  C. F. MILLER ET AL  3,363,818
SPOOL MOUNT FOR WIRE FEED DEVICE
Filed March 4, 1965
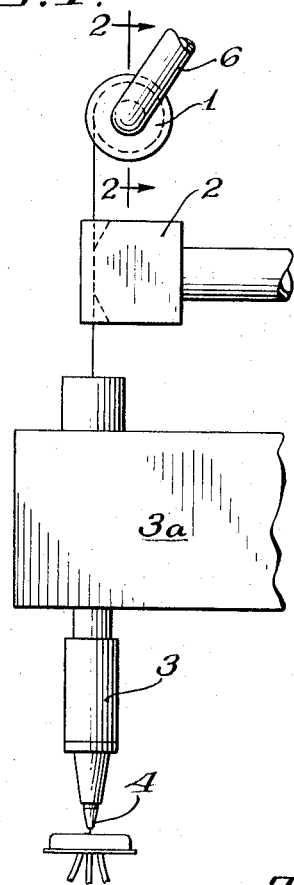
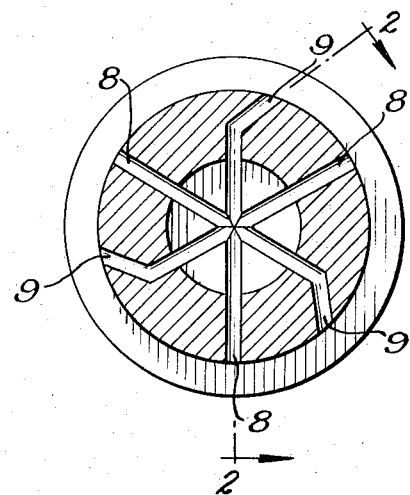
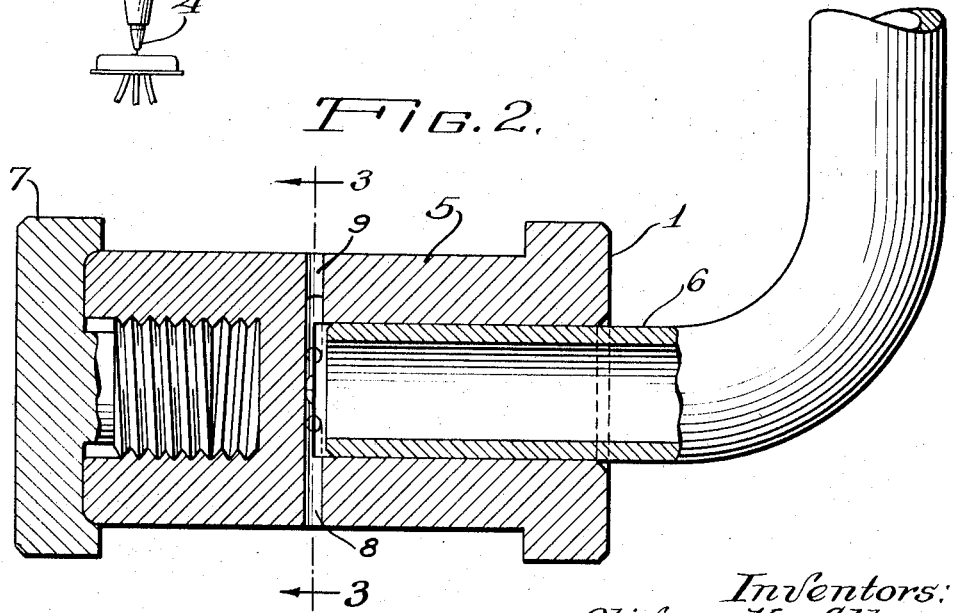
Inventors:
Oliver K. Allen
Charles Fredrick Miller
Howard L. Spicer
By Bair, Freeman & Molinare
Attys.

United States Patent Office 3,363,818
Patented Jan. 16, 1968

3,363,818
SPOOL MOUNT FOR WIRE FEED DEVICE
Charles Fredrick Miller, Anaheim, and Oliver K. Alien and Howard L. Spicer, La Habra, Calif., assignors to Basic Products Corporation, Milwaukee, Wis.
Filed Mar. 4, 1965, Ser. No. 437,134
6 Claims. (Cl. 228—3)

ABSTRACT OF THE DISCLOSURE

A substantially frictionless pneumatic spool mount for supporting and retaining a spool of filament material. A series of radial passageways are defined in a solid cylindrical mounting piece and joined at a common center point. A source of pressurized air connects to the passageways at this point. The pressurized air which passes through the passageways in multiple radial directions provides a cushion of air around the outer periphery of the cylindrically shaped spool mount between the spool and the mount. Secondary passageways may branch from the primary passageways to provide directional streams of air which accurately control rotational torque on a spool on the spool mount.

---

This invention relates to a device for mounting a spool of fine wire and controlling precisely the tension of such wire during pay-out for use. In particular, the invention relates to an air-operated spool mount for controlling tension of fine wire during pay-out to a bonding head for stitch bonding of wire to unfinished transistor devices.

There is described in co-pending applications Ser. No. 533,988, filed Mar. 14, 1966, and Ser. No. 534,245, filed Mar. 14, 1966, wire bonding machines wherein fine wire, e.g. gold wire, is bonded to die and connector elements on unfinished ceramic work pieces as part of the operation for making transistors and other semi-conductor devices. The machines comprise essentially a source of wire, a wire feeding means and a bonding tool with actuating means.

As described in the aforementioned co-pending applications, in the stitch bonding operation it is necessary to control tension in the wire for at least two reasons. First, there must be adequate tension to keep the wire taut during the shearing operation in which the wire is cut after completing a last bond so that the wire will form a sharp bend as it is formed into a notched shear blade. Secondly, the tension in the wire must not be so great that it will straighten this formed bend as the end of the bonding tool advances to contact this bend and convey the wire on to another work piece after completing a former work piece. It is also apparent that there must be sufficient tension to prevent the wire from tangling on the spool or as it leaves the spool but not enough to break the wire. These requirements are important and must all be satisfied by precise control within narrow limits. For example, a bend in 0.0007" diameter gold wire is not strong enough to convey the wire when the wire is paid from a spool mounted on high quality ball bearings because of the combined effects of friction and of inertia of the outer races of the ball bearings. On the other hand, without any tension in the wire it is not possible to form a sharp bend with the shear blades because the wire will assume a gradual shape as bending moment is distributed along the wire.

It is thus an object of this invention to provide a spool mount in which the tension of wire paid out to a bonding head can be controlled precisely.

It is another object of this invention to provide a spool mount which is simple in construction and operation and on which fresh wire may be easily mounted.

It is a further object of this invention to provide an air controlled spool mount which operates in conjunction with a wire feeder and drag means in a wire bonder to control precisely the tensions on fine wire as it is paid out to a bonding tool.

Other objects of the invention will become apparent as the invention is more fully described hereinafter.

The invention will be better understood from the drawings wherein:

FIG. 1 shows diagrammatically in elevation a wire bonding machine including the invention;

FIG. 2 is an enlarged view in section along line 2—2 of FIG. 1 showing the spool mount of the invention; and FIG. 3 is a view in section along line 3—3 of FIG. 2.

FIG. 1 shows diagrammatically a wire bonding machine which includes the spool mount of the invention. Wire is stored on spool mount 1 and is fed vertically downward by wire feeding means 2 to a bonding head 3 and actuating means therefor 3a through a capillary needle 4. The wire feeding means 2, bonding head 3 and bonding head actuating means 3a in themselves form no part of this invention. As a wire feeding means there may be employed a vibratory or rotary means as described in the Patents 3,307,761 granted Mar. 7, 1967 and 3,325,070 granted June 13, 1967, respectively. A suitable bonding tool is described in co-pending application, Ser. No. 437,980, filed Mar. 8, 1965.

Spool mount 1 comprises a cylindrical member 5 which at one end is hollow and adapted to receive a tubular member 6 which communicates with a source of pressurized gas (not shown). At the other end of spool mount 1 is a threaded cap 7 which may be manually removed from the spool mount. The outer periphery of cap 7 and the shoulder portion at the right-hand end of spool 1, as shown in FIG. 2, define a space wherein a spool of wire (not shown) may be mounted. The wire is mounted by removing cap 7 and sliding the wire spool onto mount 1.

Spool mount 1 is provided near the center along its longitudinal axis with a plurality of radial slots 8 (FIG. 3) which terminate at the periphery of spool mount 1. In the same plane as radial slots 8 are slots 9 which, as best seen in FIG. 3, extend radially from the center of mount 1 and are inclined to the radius near its periphery. Through tube 6 pressurized gas is forced into slots 8 and 9. The diameter and number of slots 8 and 9 depend on the pressure of the gas in tube 6 and the size of wire maintained on spool mount 1.

In operation, pressurized gas is delivered to spool mount 1 through tube 6 and the gas exits through slots 8 and 9 to the periphery of spool mount 1. The exiting gas forms a layer of air which is at a pressure sufficiently high to support a wire spool on spool mount 1. Gas which exits from radial slots 8 simply supports the wire off of spool mount 1. Gas which exits from slots 9 which are inclined at an angle to the radius acts to deliver a torque to the wire spool. Slots 9 are inclined such that torque applied to the wire spool is opposite to force required for downward vertical movement of the wire toward bonding head 3.

The flow of air to spool mount 1 may be controlled to satisfy several requirements. It may be regulated to just counterbalance the weight of the wire spool and thus relieve part of the friction normally encountered in pay-out of wire from the spool. Or, gas flow may be increased so that the wire spool will float on spool mount 1 in which case there will be delivered a relatively small amount of torque on the wire spool. Further increase in gas flow will deliver a still greater torque to the wire spool.

The spool mount of this invention may be used in conjunction with the vacuum drag system described in co-pending application Ser. No. 428,132, filed Jan. 26, 1965, now U.S. Patent 3,307,761, granted Mar. 7, 1967. Control of vacuum drag may be effected in co-ordination with control of torque of the wire on spool mount 1 to achieve a precise balancing of force requirements. For example, for larger wires it is desirable to set the spool torque at a value large enough that the torque overcomes the static braking of the vacuum drag and the wire retracts to the tip of the capillary after the cutting and forming. With smaller wire, on the other hand, the torque is reduced below the force of static breaking but is sufficiently great to maintain additional tension in the wire to that created by vacuum drag as wire is paid out to the bonding tool. It may also be desirable to operate wire feed such that the spool mount adds no force in tension to the wire, the amount of wire paid out by action of the vibratory or rotary feeder being controlled by the amount by which the spool is manually advanced.

What is hereinabove shown and described is the preferred embodiment of the invention, it being understood that various changes may be made in the present invention without departing from the underlying idea or principles of the invention within the scope of the appended claims.

We claim:

1. Device for manipulating pay-out of wire from a spool comprising a cylindrical member adapted to carry circumferentially a spool of wire, a source of pressurized gas communicating with the interior of said cylindrical member, a first plurality of holes in said cylindrical member extending radially from said interior to the periphery of said member and a second plurality of holes extending radially from said interior and being inclined at an angle to the radius of said member at their outer ends, whereby gas flow from said first plurality of holes is substantially normal to the surface of said cylindrical member and gas flow from said second plurality of holes is inclined to normal to said surface.

2. Device of claim 1 wherein said first and second plurality of holes are in a plane perpendicular to the longitudinal axis of said cylindrical member.

3. Device of claim 1 wherein said cylindrical member is a spool mount having a removable cap at one end.

4. Device of claim 1 wherein the angle of inclination of said second plurality of holes is substantially the same on all said holes.

5. In combination, a wire bonding device comprising a bonding tool, means for actuating said bonding tool, wire feeding means for feeding wire to said bonding tool and wire storage means comprising a cylindrical member adapted to carry circumferentially a spool of wire, a source of pressurized gas communicating with the interior of said cylindrical member, a first plurality of holes in said cylindrical member extending radially from said interior to the periphery of said member and a second plurality of holes extending radially from said interior and being inclined at an angle to the radius at their outer ends, whereby gas flow from said first plurality of holes is substantially normal to the surface of said cylindrical member and gas flow from said second plurality of holes is inclined to normal to said surface.

6. Device for storing and controlling pay-out of wire comprising a cylindrical member adapted to carry around its periphery a spool of wire, a source of pressurized gas communicating with the interior of said member, a first plurality of holes in said cylindrical member extending radially from said interior to the periphery of said member and a second plurality of holes extending radially from said interior and being inclined at an angle to the radius at their outer ends, whereby gas flow from said first plurality of holes is substantially normal to the surface of said cylindrical member and gas flow from said second plurality of holes is inclined to normal to said surface.

References Cited

UNITED STATES PATENTS

| 2,947,489 | 8/1960 | Russell | 242—18 |
| 3,134,559 | 5/1964 | Lasch et al. | 219—85 |

RICHARD H. EANES, JR., *Primary Examiner.*